United States Patent [19]

Kremer

[11] Patent Number: 5,579,106
[45] Date of Patent: Nov. 26, 1996

[54] METHOD AND APPARATUS FOR PROVIDING ASTIGMATISM-REDUCED IMAGES WITH SPECTROSCOPIC INSTRUMENTS

[75] Inventor: Alexander Kremer, Stamford, Conn.

[73] Assignee: Oriel Corporation, Stratford, Conn.

[21] Appl. No.: 391,235

[22] Filed: Feb. 21, 1995

[51] Int. Cl.[6] ..................................................... G01J 3/28
[52] U.S. Cl. .................................................................. 356/528
[58] Field of Search ........................................... 356/326, 328, 356/305, 307, 319, 330–334

[56] References Cited

U.S. PATENT DOCUMENTS

| | | | |
|---|---|---|---|
| 3,011,391 | 12/1961 | Fastie | 356/328 |
| 3,414,355 | 12/1968 | Fastie et al. | 356/334 |
| 4,634,276 | 1/1987 | Sharpe | 356/305 |
| 4,776,696 | 10/1988 | Hettrick et al. | 356/334 |
| 4,932,768 | 6/1990 | Gobeli . | |
| 4,995,721 | 2/1991 | Krupa et al. | 356/305 |
| 4,997,281 | 3/1991 | Stark | 356/328 |
| 5,182,609 | 1/1993 | Florek et al. | 356/328 |
| 5,192,981 | 3/1993 | Slutter et al. | 356/334 |
| 5,384,656 | 1/1995 | Schwenker | 356/305 X |

OTHER PUBLICATIONS

R. Yeo, "Imaging Spectroscopy", published in Spectroscopy Europe magazine, p. 20 (Apr. 6, 1992).
"Theory and principles of Monochromators, Spectrometers and Spectrographs", M.V.R.K. Murty, published in vol. 13 of Optical Engineering, pp. 23–39 (1974).
"Optics of Spectral Instruments", by I. Peisakhson, Leningrad, USSR (1975).

Primary Examiner—Vincent P. McGraw
Assistant Examiner—K. P. Hantis
Attorney, Agent, or Firm—St. Onge Steward Johnston & Reens

[57] ABSTRACT

An apparatus for providing an astigmatically-reduced image with a spectroscopic instrument is disclosed which comprises a collimator which collimates electromagnetic radiation; a cylindrical mirror which receives and reflects the collimated electromagnetic radiation; a diffractor having a surface with a plurality of diffraction rulings inscribed thereon for diffracting electromagnetic radiation directed from the collimator; and a focuser which collects, focuses and directs diffracted electromagnetic radiation and directs it towards an exit aperture. In the preferred embodiment, the cylindrical mirror comprises a concave cylindrical mirror positioned such that the cylindrical axis is substantially normal to rulings on the diffractor. In another preferred embodiment, the cylindrical mirror is convex and is positioned such that the cylindrical axis is substantially parallel to rulings on the diffractor.

22 Claims, 6 Drawing Sheets

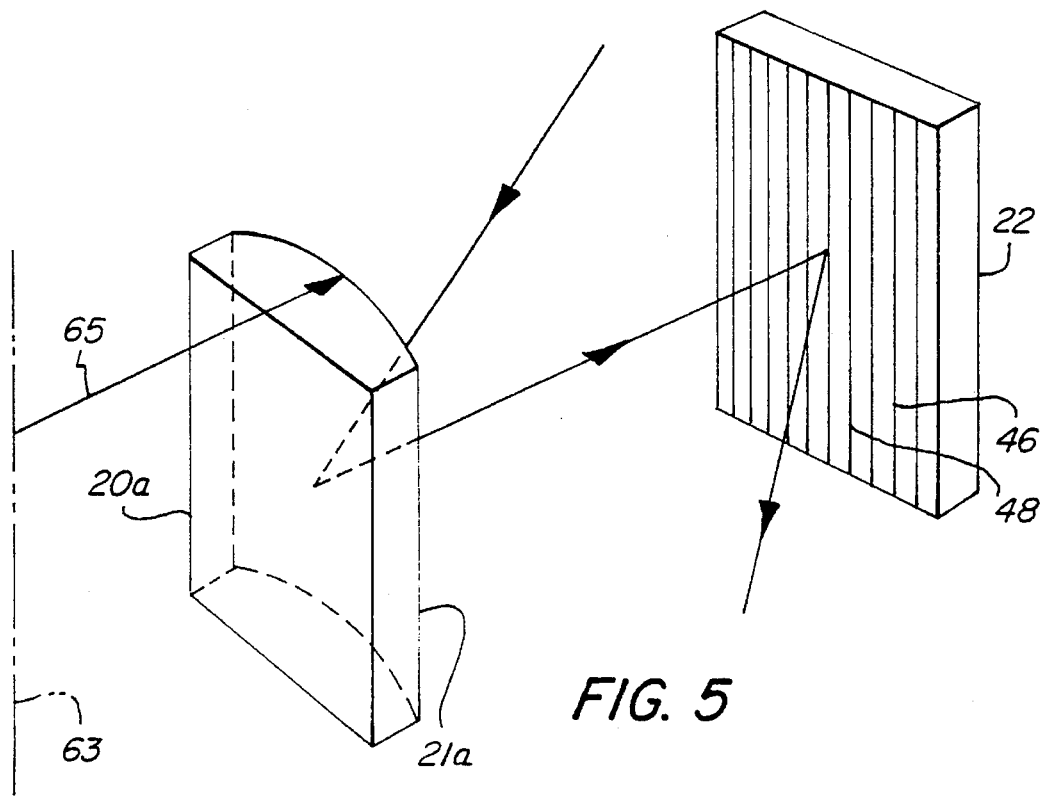
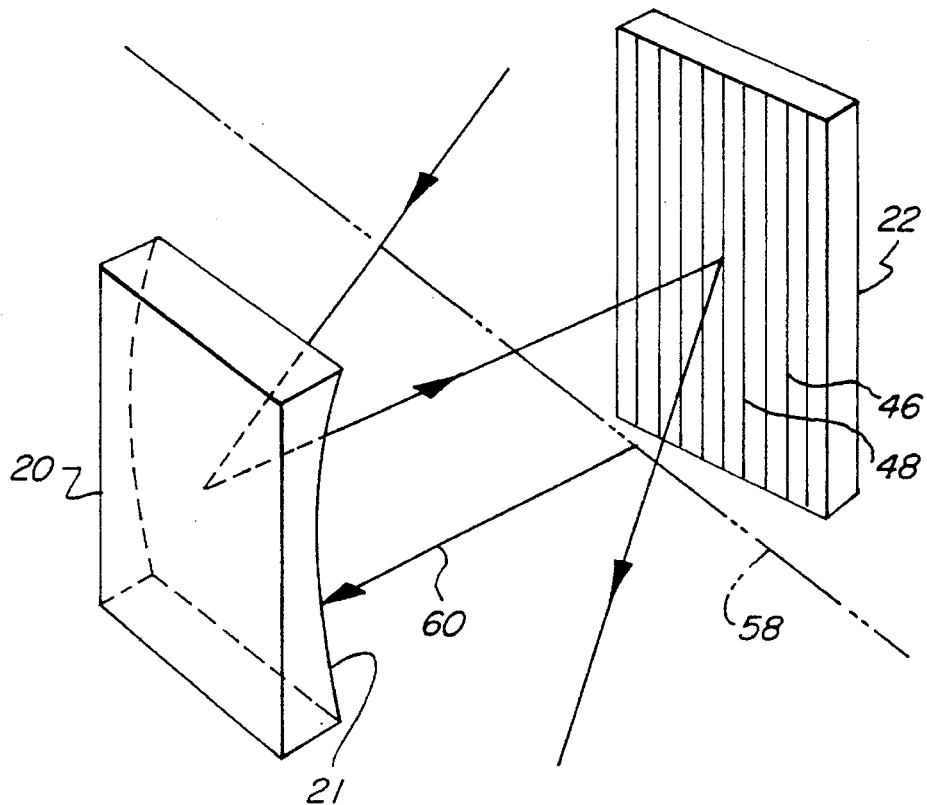

METHOD AND APPARATUS FOR PROVIDING ASTIGMATISM-REDUCED IMAGES WITH SPECTROSCOPIC INSTRUMENTS

FIELD OF THE INVENTION

The present invention relates to astigmatism-reduced spectroscopic instruments, and more specifically to astigmatism-reduced Czerny-Turner type spectrographs, monochromators and multielement detectors.

BACKGROUND OF THE INVENTION

Many different types of spectroscopic instruments have been used for many different purposes. For example, one can analyze the wavelength of light passed through the instrument and determine the characteristics about the light source.

One such type of spectroscopic instrument is commonly known as the Czerny-Turner type spectrograph. Generally speaking, this instrument comprises an entrance aperture for receiving a source of light, collimating optics, a dispersive element, such as a planar diffraction grating, and focusing optics for creating a spectrally decomposed image of the input. Though the dispersive element, collimating and focusing optics might be of the refractive type (such as prisms or lenses), the most practical type is the reflective type (such as reflective-type gratings and mirrors). The reflective type is preferred because it can be used over a wider spectral range when compared to the refractive type. For example, the refractive type is generally unworkable for electromagnetic radiation in the infrared and ultraviolet wavelength ranges. Problems associated with refractive type optics are discussed by R. Yeo in "Imaging Spectroscopy", published in Spectroscopy Europe magazine, p. 20 (Apr. 6, 1992).

Due to the nature of the reflective-type optical elements involved, it is necessary that the collimating and focusing optics be arranged in an "off-axis" configuration. This means that it is not possible to position the elements such that the normals to all the optical elements lie along a single straight line.

Unfortunately, arrangement in the off-axis configuration can introduce relatively severe aberrations into the system. The most important of these aberrations are coma and astigmatism. Coma is the "blurring" of the image along the spectral (or horizontal) range, while astigmatism is elongation of the image along the spatial (or vertical) range.

As known in the art, coma can be sufficiently corrected, for most purposes, for example, by arranging two off-axis mirrors to adjust the off-axis angles so that they have opposite orientations and magnitudes; this results in one coma being subtracted from the other, thus "cancelling" the coma. Arrangements that allow one to compensate for coma are discussed in U.S. Pat. No. 3,011,391 to W. G. Fastie; U.S. Pat. No. 3,414,355 to W. G. Fastie et al.; and in an article entitled "Theory and Principles of Monochromators, Spectrometers and Spectrographs" by M. V. R. K. Murty, published in volume 13 of Optical Engineering, pp. 23–39 (1974).

Several prior art patents discuss methods and/or apparatuses for correcting an astigmatism, the other aberration introduced into off-axis systems. For example, U.S. Pat. No. 4,932,768 to Gobeli describes using two toroidal mirrors—one as the focusing mirror and one as the collimating mirror. U.S. Pat. No. 5,192,981 to Slutter et al. attempts to reduce astigmatism by use of a single toroidal collimating mirror in combination with a spherical focusing mirror.

Unfortunately toroidal mirrors are extremely expensive to manufacture with the quality necessary for spectrographic applications. Furthermore, toroidal mirrors can only be economically manufactured with relatively high tolerances (e.g. wavelength/2) as compared with conventional mirrors (e.g. wavelength/10) and relatively degraded performance is thus experienced.

Another attempt to reduce astigmatism is discussed in U.S. Pat. No. 5,384,656 to Schwenker. Schwenker discloses replacing a planar diffraction grating with a grating ruled on a cylindrical blank. Although cylindrical surfaces are much less expensive to manufacture than toroidal surfaces and thus provide a more economical way to correct astigmatism, these gratings on a cylindrical surface are more difficult to manufacture and, hence, far more expensive than conventional planar gratings, and they are also difficult to locate in the marketplace.

It is also known that a cylindrical lens positioned between the input aperture and a collimating mirror can correct astigmatism. See "Imaging Spectroscopy", supra, at page 20. However, as mentioned before, use of refractive optics (such as lenses) create chromatic aberrations and are, for practical purposes, unusable for a wide spectral range of instruments.

It is also known that placement of a reflective-type cylindrical mirror, instead of a refractive-type lens mentioned above, positioned between an input aperture and a collimating mirror can reduce astigmatism, as described in "Optics of Spectral Instruments", by I. Peisakhson, Leningrad, USSR (1975). This approach, however, is not applicable to compact (short focal length), low F-number (high throughput) instruments. First, it is generally not convenient to construct the instrument with an additional element in the small distance (i.e., 100–150 millimeters) between the entrance aperture and the collimating mirror. This is especially true if other necessary accessories, such as a shutter, must also be positioned in this same space. Second, at low F-numbers, the off axis angle of the cylindrical mirror as taught by the prior art must be rather large (ten degrees or higher). This, when combined with the fact that the mirror as taught by the prior art is positioned in a highly divergent beam, causes significant deterioration in the overall performance of the instrument.

While correction of astigmatism is highly desirable in Czerny-Turner type spectrographs and monochromators, it becomes critical when multielement detectors are used. Multielement detectors are made up of a plurality of pixels; generally each pixel size in the spectral direction is about 20 micrometers. Typically, multielement detectors are two dimensional, that is, they have multiple elements along both the spectral and spatial direction. As a result, multitrack spectroscopy is possible; that is, multiple parallel spectral tracks from different object points along the input slit can be registered and analyzed simultaneously.

With multitrack spectroscopy, it is critical to have a sharp image not only in the spectral direction but also in the spatial direction. Otherwise, one track can "yblur" into the other. For example, a blurred image on a first track is generally not useful to a researcher, and can be problematic when the image on the first track "blurs" into an image on a neighboring second track. This "blurring" can occur when the image is not corrected for astigmatism. Thus, it is extremely important that images be corrected for astigmatism when multielement detectors are used.

Another problem associated with spectrographs when multielement detectors are used is sometimes referred to as "reentrant radiation". Reentrant radiation is that electromagnetic radiation that reflects from the detector surface and reenters the instrument, and is reflected back sometimes several times for re-detection by the detector. Reentrant radiation that is re-diffracted and then re-detected by a detector is referred to herein as reentrant spectra. Because multielement detectors are typically made of semiconductor material, such as silicon, they are typically highly reflective, thus generating much reentrant radiation, which may undesirably be re-detected as reentrant spectra. U.S. Pat. No. 4,932,768 to Gobeli discloses tilting the image plane eleven (11) degrees relative to a plane orthogonal to the central ray from the focusing mirror. This results in all radiation reflected from the detector completely missing the focusing mirror and eliminating reentrant spectra. Unfortunately, this angle is very large and may interfere with the performance of the instrument.

What is desired, therefore, is a spectroscopic instrument which has an astigmatism-reduced image, which is more economical than conventional spectroscopic instruments used to correct astigmatism, which does not utilize any difficult to manufacture (and costly) toroidal mirrors or non-planar gratings, which can correct astigmatism such that the resulting image is useable with multielement detectors, and which is designed so as to re-direct reentrant radiation so that it is not re-diffracted by a diffractor.

SUMMARY OF THE INVENTION

Accordingly, it is an object of the present invention to provide a method and apparatus for reducing or correcting astigmatism associated with spectroscopic instruments, such as Czerny-Turner type spectrographs and monochromators.

It is yet another object of the present invention to provide a method and apparatus for reducing or eliminating astigmatism such that the resulting image is usable to perform multitrack spectral analysis.

It is a still another object of the present invention to provide a method and apparatus for reducing or eliminating astigmatism which is more cost-effective than conventional methods or apparatus used to reduce or eliminate astigmatism.

It is still a further object of the present invention to provide a method and apparatus for reducing or eliminating astigmatism which does not employ toroidal mirrors, or cylindrical or toroidal diffraction gratings.

It is yet another object of the present invention to provide a method and apparatus which redirects reentrant radiation and reduces or eliminates problems associated therewith.

Other objects of the invention will be apparent and may in part appear hereinbelow.

As is known in the art, a Czerny-Turner type spectrograph includes a collimator, a focuser, and a diffractor positioned therebetween. The diffractor is, preferably, a planar diffraction grating having, most preferably, a plurality of substantially parallel diffraction gratings or rulings inscribed thereon. The deficiencies of the prior art are overcome and the objects and advantages listed above are achieved by provision of a cylindrical reflective surface, such as a mirror, positioned between the collimator and the diffractor of a Czerny-Turner type spectrograph. By cylindrical reflective surface or mirror is meant an arcuate reflective element having a radius of curvature equal to the distance between the reflective surface and its central axis ("cylindrical axis").

The cylindrical mirror at this location greatly reduces or eliminates astigmatism at the center of the field of view, and reduces astigmatism significantly at other points, as discussed more fully hereinbelow. It also allows for a compact high throughput spectroscopic instrument having both spatial and spectral resolution suitable for multielement detectors, without the use of expensive or hard to find optical elements, such as toroidal mirrors or cylindrical or toroidal gratings.

The cylindrical mirror can be either concave or convex. Most preferably, a concave cylindrical mirror is used and the mirror is positioned such that its cylindrical axis is substantially normal to the rulings of the diffraction grating. In this preferred embodiment, the cylindrical mirror has a radius of curvature sufficient to reduce astigmatism by moving the sagittal focus toward the tangential focus. Preferably, the radius of curvature is about 1500–3500 millimeters, and most preferably has a radius of curvature of about 2200–2700 millimeters.

In another preferred embodiment, the cylindrical mirror is convex and is positioned such that the cylindrical axis is substantially parallel to the rulings of the diffraction grating. In this preferred embodiment, the cylindrical mirror has a radius of curvature sufficient to reduce astigmatism by moving the tangential focus toward the sagittal focus. Preferably, the radius of curvature is about 1500–3500 millimeters, and most preferably has a radius of curvature of about 2200–2700 millimeters.

The spectroscopic instrument, then, of the present invention comprises a housing having an entrance aperture and an exit aperture. A collimator receives electromagnetic radiation through the entrance aperture and directs collimated electromagnetic radiation towards a cylindrical mirror. A cylindrical mirror receives and reflects electromagnetic radiation from the collimator and directs the electromagnetic radiation towards a diffractor. The diffractor diffracts the collimated electromagnetic radiation and directs it toward a focuser. A focuser, such as a focusable imaging mirror known in the art, collects, focuses and directs diffracted electromagnetic radiation and directs it toward the exit aperture and, optionally, for detection by a reception plane of a detector positioned at a desirable image plane.

Preferably, the image plane is tilted at an angle sufficient to prevent electromagnetic radiation reflected from the reception plane of the detector from being re-diffracted by the diffractor. Most preferably, the image plane is tilted from about 3–8 degrees from a plane positioned orthogonal to the line defined by a central wavelength arranged on the image plane.

The invention and its particular features and advantages will become more apparent from the following detailed description when considered with reference to the accompanying drawings.

BRIEF DESCRIPTION OF THE DRAWINGS

FIG. 4 is a schematic view of a concave cylindrical mirror showing its placement relative to rulings on a diffraction grating;

FIG. 5 is a schematic view of a convex cylindrical mirror showing its placement relative to rulings on a diffraction grating;

DETAILED DESCRIPTION OF THE DRAWINGS

Figure 1:
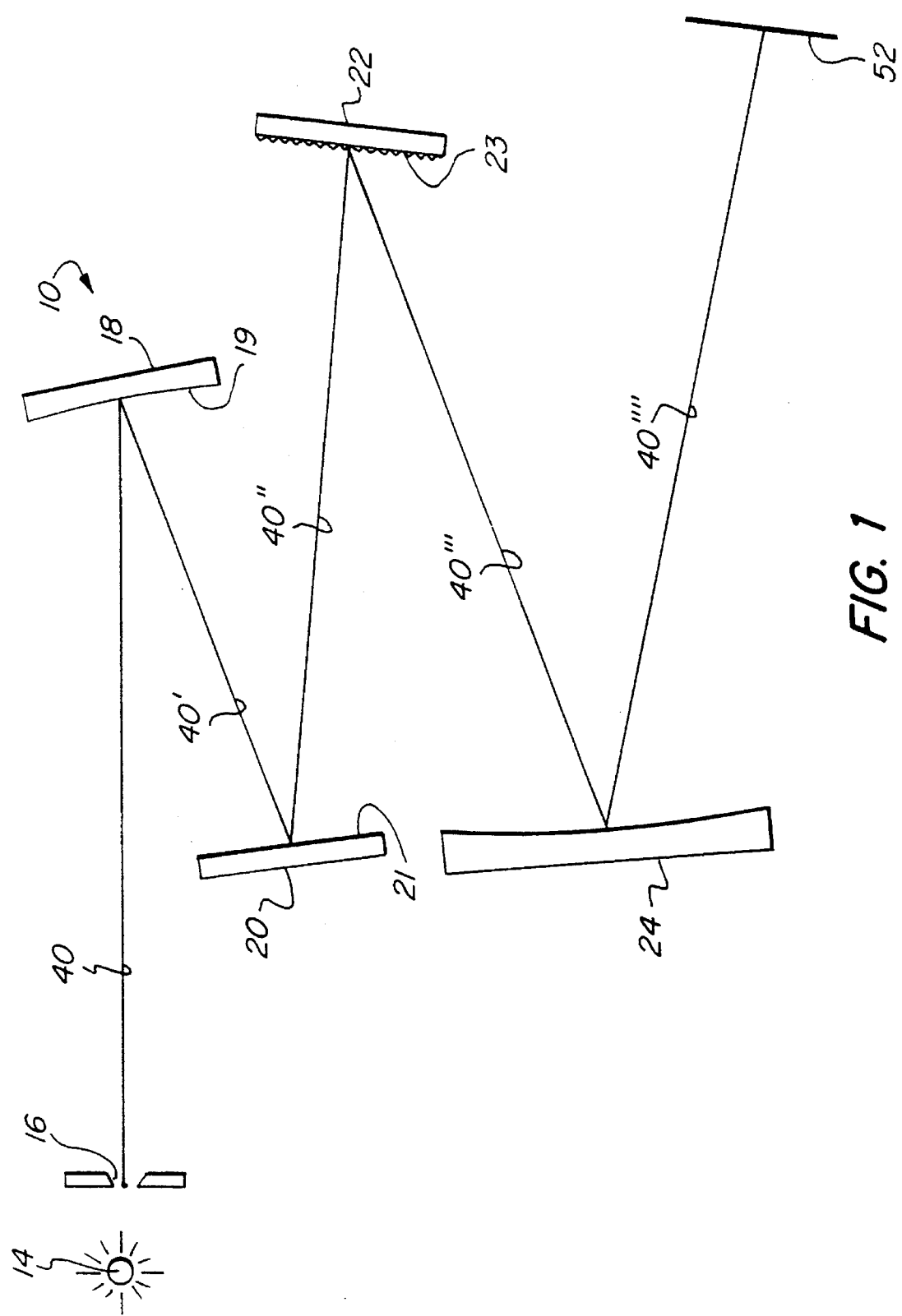
FIG. 1 is a schematic diagram of a spectroscopic instrument constructed in accordance with the present invention showing a cylindrical mirror positioned between a collimator and a diffractor.

Referring to the drawings in detail, a spectroscopic instrument which reduces or eliminates astigmatism is shown and generally designated by the reference numeral 10. It should be noted that for the sake of clarity all the components and parts of instrument 10 may not be shown and/or marked in all the drawings.

It should be understood that references to "spectroscopic apparatus" or "spectroscopic instrument" includes both Czerny-Turner type spectrographs and monochromators. "Spectrograph" is referred to denote those applications for viewing a plurality of wavelengths, while "monochromator" refers to that operation of a spectroscopic apparatus to obtain an output of a single wavelength. Spectrographs which have been suitably corrected for astigmatism, thus allowing one to perform multitrack spectroscopic analysis, may be referred to herein as "imaging spectrographs".

Figure 2:
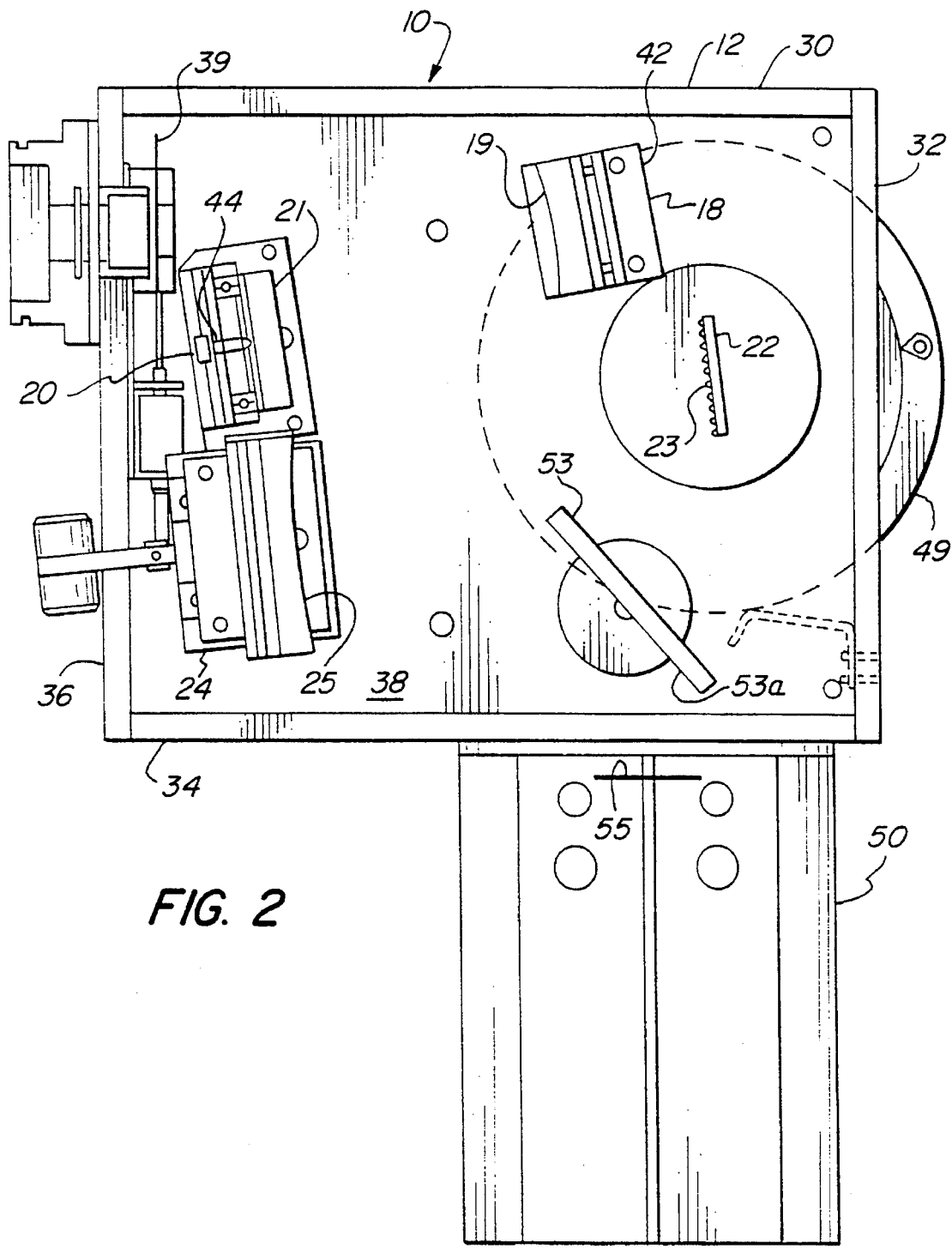
FIG. 2 is a top plan view of the spectroscopic instrument of FIG. 1 without any electromagnetic radiation input.
Figure 3:
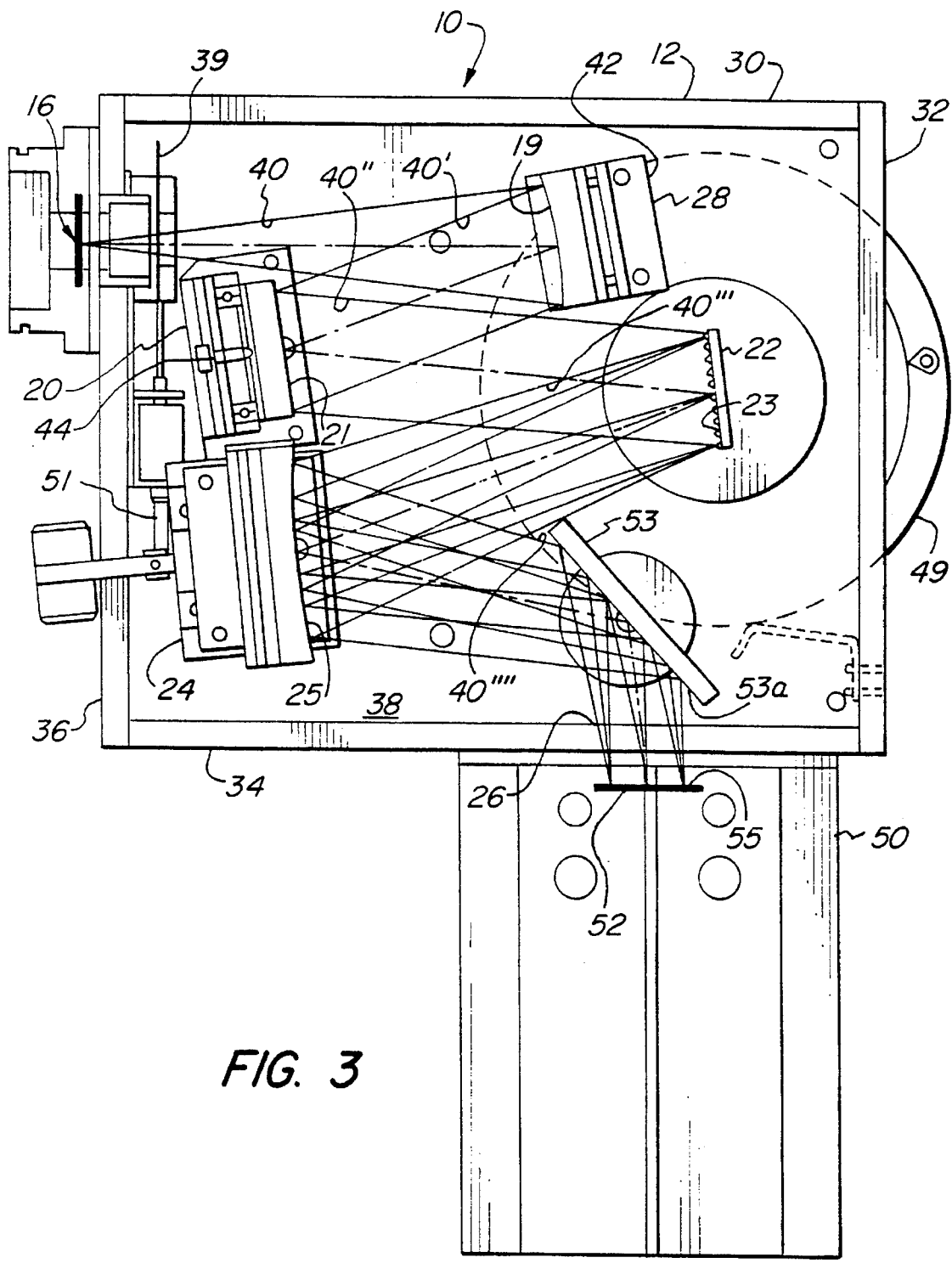
FIG. 3 is a top plan view of the spectroscopic instrument of FIG. 2 showing the paths of three wavelengths from a source of electromagnetic radiation.

Referring to FIGS. 1–3, spectroscopic instrument 10 comprises housing 12 (FIGS. 2, 3) through which electromagnetic radiation enters from source 14 (FIG. 1) through at least one entrance aperture 16 (FIGS. 1, 3), a collimator 18 for collimating the electromagnetic radiation, a cylindrical mirror 20 for reflecting the collimated electromagnetic radiation, a diffractor 22 for diffracting the electromagnetic radiation, and a focuser 24 for collecting, focusing and directing the diffracted electromagnetic radiation towards at least one exit aperture 26 (FIG. 3). It should be understood that the off-axis angles of each of these elements are set to predetermined values that effectively produce a suitable image for viewing or detecting.

Referring to FIGS. 2–3, housing 12 has a plurality of sidewalls 30, 32, 34, 36 a base 38 and a top (which has been removed for clarity). Generally, all surfaces of housing 12, both inside and out, are covered with a black roughened surface in order to maximize absorption of electromagnetic radiation. In accordance with the preferred embodiment, black anodization is the preferred technique for achieving the rough matte black surface desired.

Housing 12 contains shutter 39 positioned between entrance aperture 16 and collimator 18. Shutter 39 serves, inter alia, to take a background spectra for proper correction of spectra of an unknown source. Also, shutter 39 is necessary for performing multitrack spectroscopy with multichannel detectors.

Spectroscopic instrument 10 comprises at least one entrance aperture 16 (FIGS. 1, 3) and exit aperture 26 (FIG. 3) both of conventional design. For example, entrance aperture 16 has an adjustable width of approximately twenty microns to about two millimeters, and a height of about two to about five millimeters. It should be understood that, for example, exit aperture 26 may be adjusted in a manner known in the art according to one's desire to operate spectroscopic instrument 10 as, for example, a spectrograph or as a monochromator.

Referring to FIGS. 1, 3, collimator 18 having collimating surface 19 receives diverging rays 40 emitted through entrance aperture 16, converts them to substantially parallel rays 40' and directs them to cylindrical mirror 20. Collimator 18 includes adjustment mechanism 42 (FIGS. 2, 3) movable to alter the direction of parallel rays 40'. Collimator 18 is preferably provided as a spherical collimating mirror for applications involving a broad range of wavelengths.

Cylindrical mirror 20 having reflecting surface 21 receives collimated rays 40' and reflects them to diffractor 22 as shown by ray 40". In this regard, cylindrical mirror 20 includes adjustable mechanism 44 (FIGS. 2, 3) movable to alter the direction of reflected rays 40". It should be understood that, although this description is written in terms of a cylindrical mirror, any suitable cylindrical reflective surface may be used so long as the resulting image is desirably astigmatically corrected.

Notably, cylindrical mirror 20 is positioned, with regard to the path of the electromagnetic radiation, so as to receive a collimated, or parallel beam, of electromagnetic radiation from collimator 18. This placement is significantly different than the placement taught by the prior art which teaches placing a cylindrical mirror, with regard to the path of the electromagnetic radiation, between an input aperture and a collimator. As such, the cylindrical mirror reflects a divergent beam. Placement of a cylindrical mirror in the position taught by the prior art results in deterioration of the overall performance of the instrument. Conversely, use of a cylindrical mirror as taught by applicant, positioned between the collimator 18 and grating 22, results in an astigmatically-reduced image which is suitable for different purposes, as discussed herein below, without introducing additional aberations into the system.

Diffractor 22 has diffracting surface 23 which has a plurality of diffraction rulings, for example, 46, 48 (FIG. 4) inscribed thereon. Most preferably, the diffraction rulings are arranged so as to be substantially parallel to each other. Diffractor 22 is positioned to receive the collimated electromagnetic rays 40" from cylindrical mirror 20 and defract, or spectrally decompose them, and it is also positioned such that diffracted electromagnetic radiation shown, for example, by ray 40''', is directed towards focuser 24. In this regard, diffractor 22 includes adjusting mechanism 49 movable to alter the direction of the diffracted rays 40'''. Any suitable plane diffractor known in the art may be used, such as that one sold by ORIEL Instruments located in Stratford, Conn. (catalog number 77411).

Referring to FIGS. 1–3, focuser 24 having focusing surface 25 receives diffracted rays 40''' from diffraction grating 22, converts them to converging rays 40'''', and focuses and directs them towards an optional flat reflective mirror 53 (FIGS. 2, 3), having reflecting surface 53a, then towards exit aperture 26 for arrangement on image plane 52. Focuser 24 includes a adjustable mechanism 51, known in the art, to alter the direction and focus of converging rays 40''''. Flat reflective mirror 53 merely redirects rays 40'''' to a more desirable location for exit aperture 26.

Focuser 24 is preferably a spherical focusable imaging mirror, which is known in the art. It is understood, however, that other focusing devices known in the art may be used.

Referring to FIG. 3, detector 50 having reception plane 55 positioned at image plane 52 may generally be a single element, linear array, two dimensional array or other more sophisticated detector which may be linked to one or more multichannel analyzers for data collection and analysis in technical or other applications involving high performance spectral analysis as discussed hereinbelow.

Figure 7:
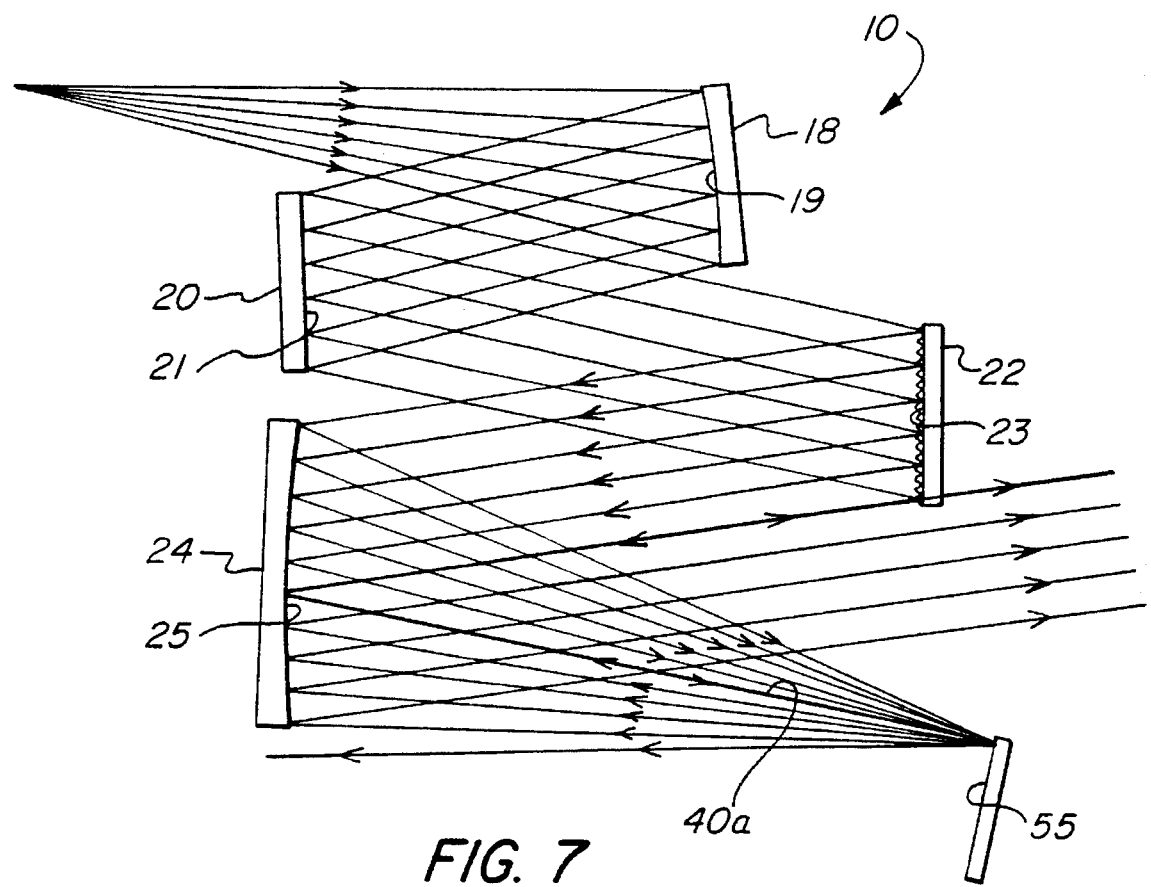
FIG. 7 is a schematic diagram showing a preferred tilt of an image plane to prevent an "extreme" wavelength from reflecting from a detector surface positioned at the image plane and being re-diffracted by the diffractor.
Figure 8:
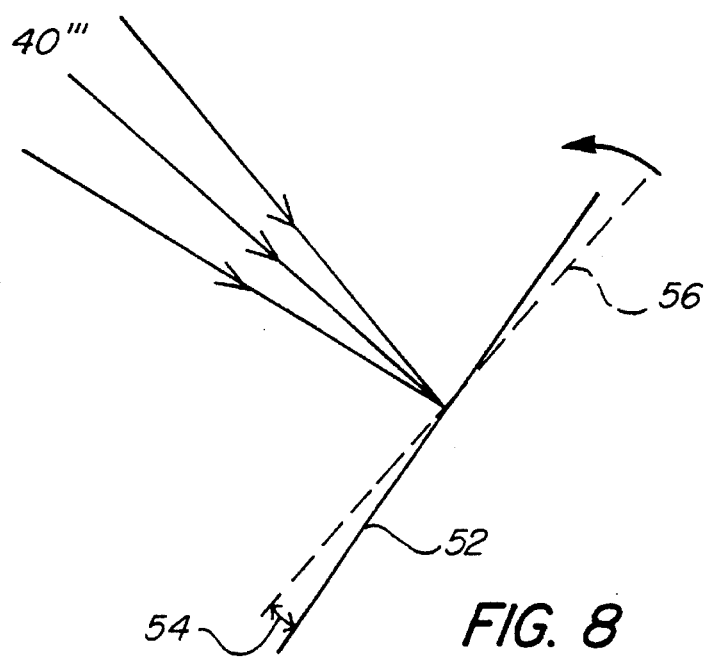
FIG. 8 is a schematic diagram showing a method to measure the proper tilt of the image plane of FIG. 7.

Referring to FIGS. 1, 8, image plane 52 is preferably tilted at an angle 54 (FIG. 8) sufficient to allow some reentrant radiation to be directed towards and reflect from focusing mirror 24, however, the tilt is sufficient prevent reentrant radiation 40a (FIG. 7) reflected from focusing mirror 24 from being re-diffracted by diffractor 22. Angle 54, as best shown in FIG. 8, is measured as that angle between image plane 52 and plane 56, which is normal to a central wavelength 40"" arranged on image plane 52. Most preferably, image plane 52 is tilted about 3–8 degrees from normal plane 56.

While it is acceptable to allow some reentrant radiation to reflect from focusing mirror 24, it is undesirable to allow any amount of reentrant radiation, such as 40a (FIG. 7), directed from focusing mirror 24 to be re-diffracted by diffractor 22 for at least the following reason. It is possible to trap and absorb radiation, such as 40a, reflected from focusing mirror 24 which misses the grating 22. However, it is virtually impossible to trap and absorb reentrant radiation after it has been re-diffracted from the grating because it diffracts into a fan of rays having multiple diffraction orders.

Unlike the prior art, which discloses tilting the image plane sufficiently to totally avoid any reentrant spectra by preventing the reentrant radiation from contacting the focusing mirror, Applicant takes advantage of the fact that some reentrant radiation may permissibly contact the focusing mirror, so long as the reentrant radiation reflected from the focusing mirror does not contact the diffractor and become re-diffracted. As such, the angle of tilt required for image plane 52 is smaller than that taught by the prior art and allows for better overall performance of spectroscope 10.

When comparing the schematic representation of FIG. 1 with the illustrations in FIGS. 2, 3, it should be understood that flat mirror 53 is optional and not necessary for the operation of the invention or the reduction of astigmatism. Flat mirror 53 has been inserted in the embodiment of the invention illustrated in FIGS. 2 and 3 to allow sufficient room for detector 50. The only alteration of the electromagnetic radiation accomplished by mirror 53 is its direction.

Referring to FIG. 4, in the preferred embodiment, cylindrical mirror 20 having reflecting surface 21 is more particularly a concave cylindrical mirror, having cylindrical axis 58 therethrough and a predetermined radius of curvature defined by arrow 60. Most preferably, mirror 20 is positioned such that the cylindrical axis 58 is substantially normal to rulings such as 46, 48 on diffractor 22. Cylindrical mirror 20 has a radius of curvature sufficient to correct for astigmatism, and more particularly, to move the sagittal focus toward the tangential focus. Preferably, the radius of curvature is between about 1500 and about 3500 millimeters, and most preferably about 2200–2700 millimeters.

In another preferred embodiment (FIG. 5), spectroscopic instrument 10 comprises a convex cylindrical mirror 20a, having reflecting surface 21a, which is positioned such that the cylindrical axis 63 is substantially parallel to rulings 46, 48, for example, on the diffractor 22. Convex cylindrical mirror 20a has a radius of curvature defined by arrow 65. Radius of curvature 65 should be sufficient to correct for astigmatism, and more particularly, to move the tangential focus toward the sagittal focus. Preferably the radius of curvature is about 1500 to about 3500 millimeters, and most preferably about 2200–2700 millimeters.

Astigmatism can be described as the displacement of tangential focus formed by a fan of horizontal rays) from the sagittal focus (formed by a fan of vertical rays). Thus, when an image is not stigmatic, instead of a point at the preferred location of the tangential focus, a vertical line will appear; and instead of a point at the preferred location of the sagittal focus, a horizontal line will appear. Use of concave cylindrical mirror 20 (FIG. 4) at the location taught by applicant reduces astigmatism by moving the sagittal focus closer to tangential focus. Use of a convex mirror 20a (FIG. 5) at the location taught by applicant reduces astigmatism by moving the tangential focus backwards toward the sagittal focus.

Figure 6:
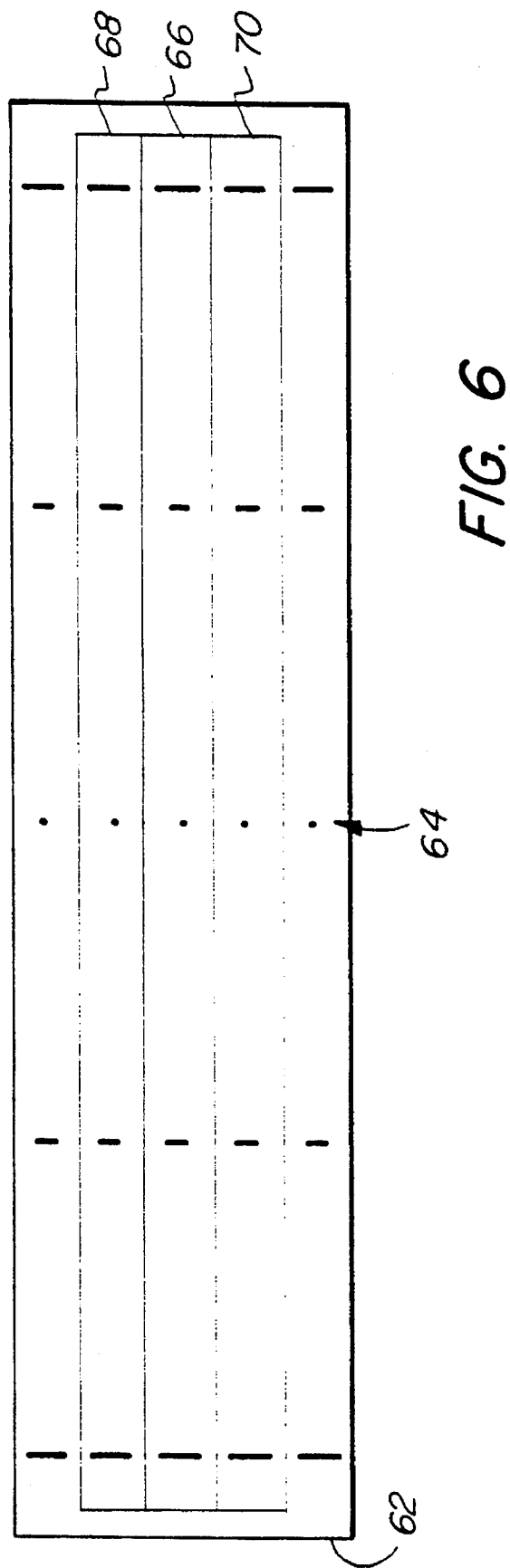
FIG. 6 is a view of a computer-generated field-of-view showing astigmatically-reduced images of a plurality of wavelengths and plurality of object points produced by the spectrograph of FIGS. 1–4.

Using concave cylindrical mirror 20 as taught by the present invention results in an astigmatically-reduced image, as illustrated in computer-generated field of view 62. See FIG. 6. It should be noted that the center wavelength 64 is the most astigmatically-reduced image. As shown, the image of each wavelength in each horizontal track, such as 66 (represented in dashed lines) is separate and distinct from those of track 68 above it and those of track 70 below it. Thus, the resulting image is sufficient for performance of multitrack analysis. By way of comparison, for example, a Czerny-Turner system with similar off-axis angles for the collimating mirror, focusing mirror and cylindrical mirror, as described later, which is not corrected for astigmatism will have an image that is about 3–4 millimeters high, which is not suitable for use for multitrack spectral analysis.

It should be understood that the radius of curvature of cylindrical mirror 20, 20a will vary depending on, inter alia, the off-axis angles of the collimating mirror 18, focusing mirror 24, and cylindrical mirror 20; other factors include the focal lengths of these mirrors and the F number, or throughput, desired.

The preferred radius of curvature of mirror 20 (FIG. 4), for example, is based on collimating mirror 18 having an off-axis angle of about 8–12 degrees, the focusing mirror 24 having an off-axis angle of about 14–18 degrees, and cylindrical mirror 20 having an off-axis angle of about 10–15 degrees. The preferred radius of curvature is also based upon an F number of about 3.0–4.0, and a focal length of about 100–200 millimeters.

A method for providing an astigmatism-reduced spectroscopic instrument comprises the following steps as shown in FIGS. 1–3. First, electromagnetic radiation emitted from source 14 (FIG. 1) is collimated by collimator 18 after it passes through entrance aperture 16. Then the electromagnetic radiation is reflected by, preferably, concave cylindrical mirror 20 (FIGS. 1–4), or by convex cylindrical mirror 20a (FIG. 5). Afterwards the electromagnetic radiation is diffracted by diffractor 22 and collected, focused and directed by focuser 24 towards exit aperture 26. After passing through exit aperture 26, the electromagnetic radiation may, optionally, be detected by reception plane 55 of detector 50, wherein the reception plane is positioned at image plane 52.

Preferably, image plane 52 is tilted at angle 54 sufficient to prevent reentrant radiation 40a (FIG. 7) from being re-diffracted by diffractor 22. Most preferably image plane 52 is tilted about 3–8 degrees, as shown in FIG. 8.

The present invention, therefore, provides a new, useful and cost effective method and apparatus for correcting astigmatism in Czerny-Turner type spectrographs and monochromators, and correcting it sufficiently such that multielement spectroscopic analysis may be performed.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for providing an astigmatically-reducing image with a spectroscopic instrument comprising:

a housing having an entrance aperture and an exit aperture;

a collimator, positioned inside the housing, for receiving and collimating elecromagnetic radiation entering through the entrance aperture;

a cylindrical reflective surface, positioned inside the housing, for receiving and reflecting collimated electromagnetic radiation, the cylindrical reflective surface having a cylindrical axis and a radius of curvature;

a diffractor, positioned inside the housing, for receiving and diffracting the collimated electromagnetic radiation reflected from the cylindrical reflective surface, the diffractor having a surface with a plurality of diffraction rulings inscribed thereon; and a focuser, positioned inside the housing, the collecting, focusing and directing electromagnetic radiation diffraction from the diffractor towards the exit aperture.

2. The apparatus of claim 1 wherein the cylindrical reflective surface comprises a concave cylindrical mirror positioned such that the cylindrical axis is substantially normal to the rulings on the diffractor.

3. The apparatus of claim 2 wherein the concave cylindrical mirror has a radius of curvature sufficient to substantially correct for astigmatism.

4. The apparatus of claim 3 wherein the concave cylindrical mirror has a radius of curvature between about 1500 and about 3500 millimeters.

5. The apparatus of claim 1 wherein the cylindrical reflective surface comprises a convex cylindrical mirror positioned such that the cylindrical axis is substantially parallel to the rulings on the diffractor.

6. The apparatus of claim 5 wherein the convex cylindrical mirror has a radius of curvature sufficient to substantially correct for astigmatism.

7. The apparatus of claim 6 wherein the convex cylindrical mirror has a radius of curvature between about 1500 and about 3500 millimeters.

8. The apparatus of claim 1 wherein the apparatus comprises a monochromator.

9. The apparatus of claim 1 wherein the apparatus comprises a spectrograph.

10. The apparatus of claim 9, the apparatus further comprising a detector having a reception plane for detecting focused electromagnetic radiation, the reception plane being positioned at an angle sufficient to prevent electromagnetic radiation reflected from the reception plane and reentering the spectroscopic apparatus, and reflected by the focuser, from being re-diffracted by the diffractor, wherein the angle is measured from a plane normal to a central wavelength detected by the detector.

11. The apparatus of claim 10 wherein the angle is about 3–8 degrees.

12. A spectrograph comprising:

a housing having an entrance aperture and an exit aperture and an inside and an outside;

a collimator, positioned inside the housing, for collimating electromagnetic radiation passing through the entrance aperture;

a cylindrical mirror, positioned inside the housing, for receiving and reflecting collimated electromagnetic radiation, the cylindrical mirror having a cylindrical axis and a radius of curvature;

a diffractor, positioned inside the housing, for receiving and diffracting the collimated electromagnetic radiation reflected from the cylindrical mirror, the diffractor having a surface with a plurality of diffraction rulings thereon;

a focuser, positioned inside the housing, for collecting, focusing and directing diffracted electromagnetic radiation; and a detector, positioned outside the housing, the detector having a reception plane for detecting the focused electromagnetic radiation, the reception plane being positioned at an angle sufficient to prevent electromagnetic radiation reflected from the reception plane and re-entering the housing and reflected by the focuser from being re-diffracted by the diffractor, wherein the angle is measured from a plane normal to a central wavelength arranged on the reception plane.

13. The spectrograph of claim 12 wherein the cylindrical mirror comprises a concave cylindrical mirror positioned such that the cylindrical axis is substantially normal to rulings on the diffractor.

14. The spectrograph of claim 13 wherein the concave cylindrical mirror has a radius of curvature sufficient to substantially correct for astigmatism.

15. The spectrograph of claim 14 wherein the concave cylindrical mirror has a radius of curvature between about 1500 and 3500 millimeters.

16. The spectrograph of claim 12 wherein the cylindrical mirror comprises a convex cylindrical mirror positioned such that the cylindrical axis is substantially parallel to rulings on the diffractor.

17. The spectrograph of claim 16 wherein the concave cylindrical mirror has a radius of curvature sufficient to substantially correct for astigmatism.

18. The spectrograph of claim 17 wherein the convex cylindrical mirror has a radius of curvature between about 1500 and 3500 millimeters.

19. The spectrograph of claim 13 wherein the the angle is about 3–8 degrees.

20. A method for providing an astigmatism-reduced image with a spectroscopic instrument comprising the following steps:

collimating electromagnetic radiation passing through an entrance aperture;

reflecting collimated electromagnetic radiation by a cylindrical reflecting surface after the electromagnetic radiation has been collimated by the collimator;

diffracting the collimated electromagnetic radiation after it has been reflected by the cylindrical reflecting surface; and collecting, focusing and directing the diffracted electromagnetic radiation towards an exit aperture by a focuser.

21. The method of claim 20 further comprising the steps of providing a detector having a reception plane, and arranging the diffracted electromagnetic radiation on the reception plane.

22. The method of claim 21 further comprising the step of positioning the detector reception plane at an angle sufficient to prevent electromagnetic radiation reflected from the reception plane, re-entering the exit aperture, and reflected by the focuser, from being re-diffracted by the diffractor, wherein the angle is measured from a plane normal to a central wavelength arranged on the reception plane.

* * * * *